United States Patent
Biro et al.

[11] Patent Number: 6,015,002
[45] Date of Patent: Jan. 18, 2000

[54] MULTI-LAYER SLATS FOR VERTICAL AND HORIZONTAL BLINDS

[76] Inventors: Michael Julius Biro, 4014 NW. 24th Ter., Boca Raton, Fla. 33431; David Swinscoe, 424 Hendricks Isle, No. 8, Fort Lauderdale, Fla. 33301

[21] Appl. No.: 08/970,851

[22] Filed: Nov. 14, 1997

[51] Int. Cl.[7] .................................................. E06B 9/30
[52] U.S. Cl. .............................. 160/168.1 R; 160/236; 428/121
[58] Field of Search ............................ 160/236, 168.1 R; 427/424; 264/173.12, 173.16, 173.18, 45.9; 428/121

[56] References Cited

U.S. PATENT DOCUMENTS

| | | |
|---|---|---|
| 3,645,317 | 2/1972 | Malone . |
| 4,049,038 | 9/1977 | Hyman et al. ...................... 160/166 A |
| 4,509,825 | 4/1985 | Otto et al. . |
| 4,519,435 | 5/1985 | Stier .................................. 160/166 A |
| 4,842,036 | 6/1989 | Goodman . |
| 4,877,077 | 10/1989 | Ebert ....................................... 160/236 |
| 5,119,871 | 6/1992 | Schwaegerle ......................... 160/236 |
| 5,121,785 | 6/1992 | Ohsumi . |
| 5,209,282 | 5/1993 | Franco et al. ......................... 160/236 |
| 5,271,447 | 12/1993 | Aronovich ............................. 160/236 |
| 5,360,281 | 11/1994 | Kamen et al. . |
| 5,496,630 | 3/1996 | Hawrylko et al. . |
| 5,613,542 | 3/1997 | Tuzmen et al. . |
| 5,632,316 | 5/1997 | Cohen ................................ 160/168.1 |
| B1 4,877,077 | 6/1991 | Ebert ....................................... 160/236 |

FOREIGN PATENT DOCUMENTS

| | | | |
|---|---|---|---|
| 3446662 | 6/1982 | Germany ............................. 160/236 |
| 3040892 | 9/1982 | Germany ............................. 160/236 |

*Primary Examiner*—Blair M. Johnson
*Attorney, Agent, or Firm*—Ronald V. Davidge

[57] ABSTRACT

A first version of a multilayer slat for horizontal or vertical blind assemblies includes a translucent inside layer, a first transparent base layer, and a translucent outside layer. This slat may also include a second base layer, which is either transparent or translucent depending on the percentage of light to be transmitted through the slat. The base layer may be of a different color than the inside layer, so that light transmitted through the slat is viewed as being differently colored than light reflected from the surface of the slat. The inside layer of the slat may include a foaming agent producing a matte surface texture. Another version of the multilayer slat includes a laminated inside layer, with a foaming agent in a base layer causing a matte surface texture of the laminated layer.

12 Claims, 3 Drawing Sheets

FIG. 1.
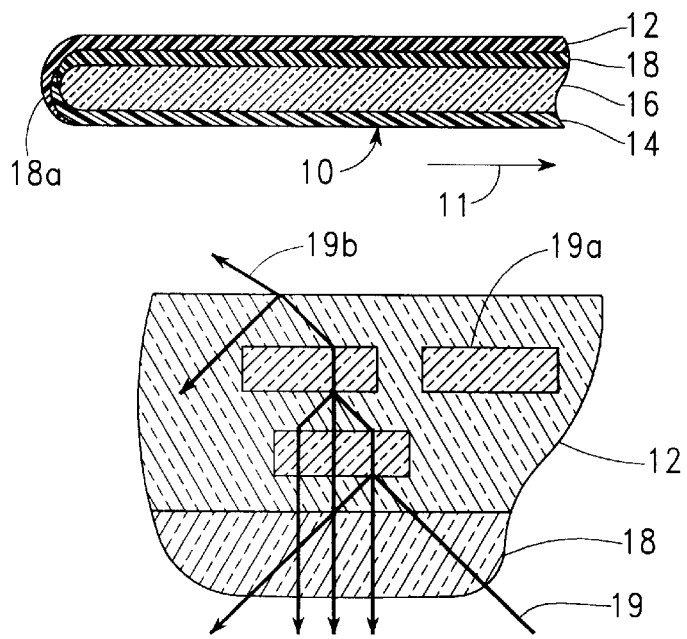
FIG. 2.
FIG. 3.
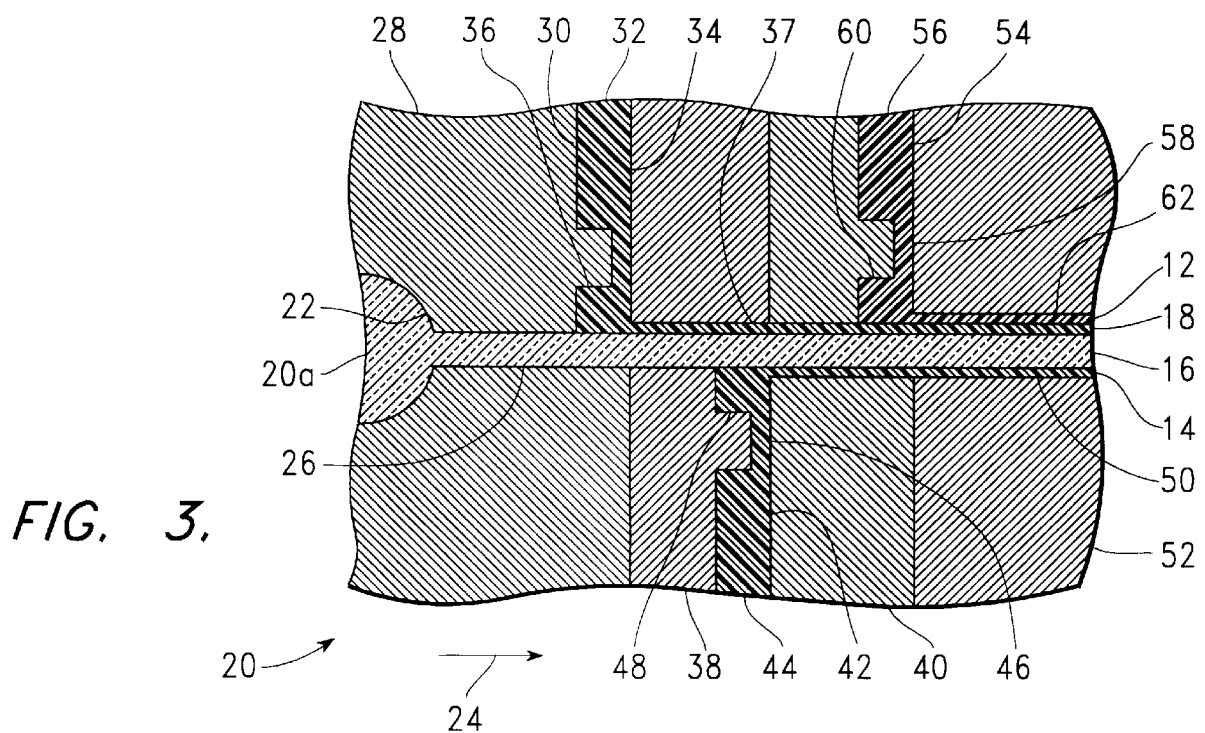

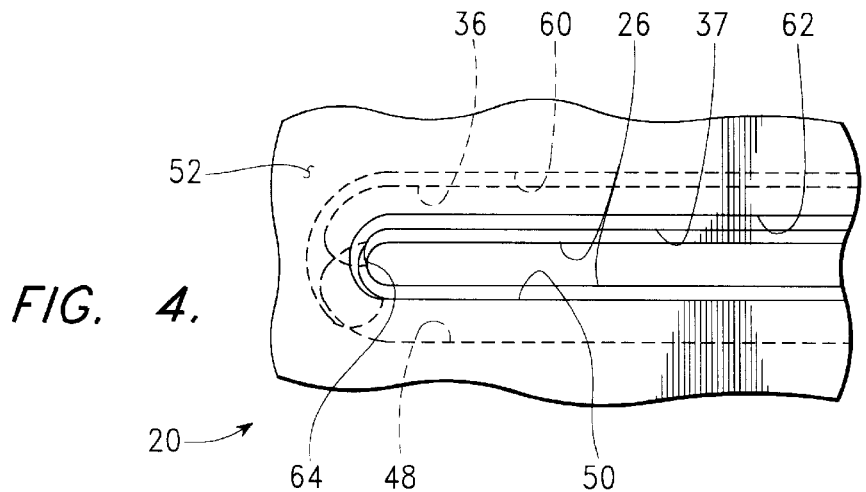
FIG. 4.
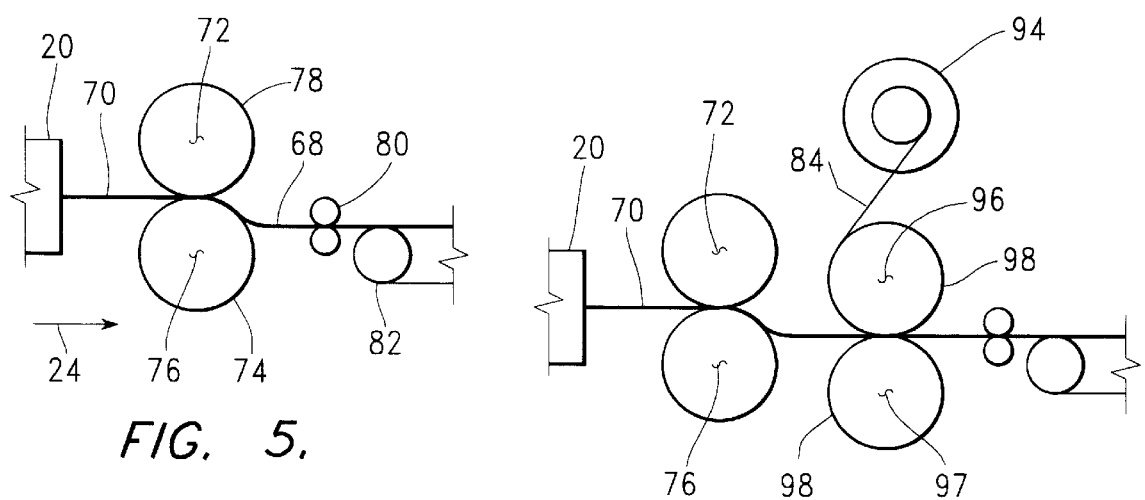
FIG. 5.
FIG. 7.
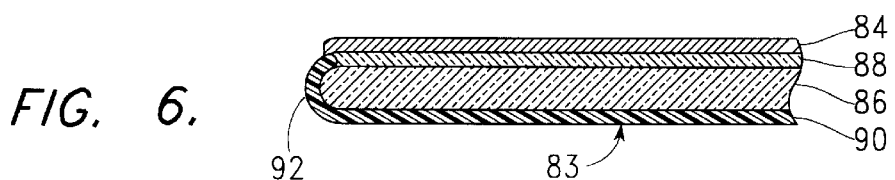
FIG. 6.

MULTI-LAYER SLATS FOR VERTICAL AND HORIZONTAL BLINDS

BACKGROUND OF THE INVENTION

1. Field of the Invention

This invention relates to translucent slats for both vertical and horizontal window or door blinds, and, more particularly, to such slats as manufactured by a coextrusion process.

2. Background Information

Translucence is an optical property which is highly desirable in window coverings to afford admission of sunlight into a room during the day without compromising privacy at night. Popular examples of translucent window coverings are found in shades using translucent fabric materials, which may be rolled up on a single roll at the top of a window, or which may be raised into a pleated or accordion fold as Roman shades. While such shades can be lowered to cover a window or raised to reveal a clear view, they are limited to presenting a rectangular translucent area; they cannot be partially opened to reveal slots through which the outside world may be viewed. On the other hand, horizontal or vertical blinds are variable louvered structures, which may be fully closed, fully open and drawn back, or partly open to present a number of slots through which the outside world may be viewed.

However, blinds are not available with translucent slats. Part of the reason for this is caused by the fact that blinds are typically exposed to very harsh ultraviolet energy, both from exterior sunlight and from interior florescent lighting. Slats for horizontal and vertical blinds are often composed of thermoplastic materials, such as PVC (polyvinyl chloride), which are available in clear or translucent forms. However, such materials are subject to severe discoloration when they are exposed to ultraviolet light, unless they include UV stabilizers. These UV stabilizers additionally turn a transparent material into a translucent material. However, when otherwise transparent PVC is loaded with sufficient UV stabilizers to achieve an adequate lifetime in use as a blind slat, and when such material is formed into a slat having a thickness sufficient to provide the rigidity needed in a blind application, the resulting slat is essentially opaque, lacking an ability to provide indoor lighting by transmitting outdoor light during daytime.

Therefore, what is needed is a slat for vertical or horizontal blinds having a combination of sufficient thickness for rigidity, sufficient UV stabilizers to prevent discoloration, and optical translucence.

Conventional parts made from thermoplastic materials have glossy surfaces, even when they are made in textured molds or extruded between textured rollers. In the area of window treatments, flat, or matte surfaces are often preferred to give a look of quality. Therefore, what is also needed is a horizontal or vertical blind slot having a matte finish.

A history of the development of pearlescent pigments is given by Roman Maisch and Manfred Weigand in *Pearl Luster Pigments*, verlag moderne industrie, Germany, which forms the basis of the following discussion. Pearlescent pigments are used to give manufactured objects a luster similar to that of a natural pearl, which grows inside an oyster as a foreign body, such as a grain of sand, is encapsulated with alternating fine layers of protein and calcium carbonate. The layers of calcium carbonate act as thin transparent mirrors when they are struck by light rays. While some of the light is reflected, most of the light is refracted and transmitted through the layer. When the transmitted light strikes the next (lower) calcium carbonate layer, the process begins again, so that a person viewing a pearl sees light reflected and refracted at many layers, giving an appearance that some of the light is coming from relatively deep inside the pearl.

Pearlescent pigments are made up of transparent lamellae, which are arranged in a parallel fashion within a transparent structure, so that multiple reflections cause the shining effect typical of natural pearls. The first known reference to pearlescent pigments was made by Johann Christian Wiegleb in his *Handbook of General Chemistry*, 1781, in which a method of a French chemist Jaquin, dating from about 1650, for making false pearls is described. During the 19th century, a thriving industry developed in and around Paris to manufacture pearl essences in the form of concentrated suspensions of guanine/hypoxanthine mixed crystals from fish scales. However, the extraction of this material is very complex, and therefore expensive.

The first synthetically manufactured pearlescent pigments were monocrystalline compounds in the form of mercury chloride and lead arsenate, which are not presently used because of their toxicity. Next, in the 1930s, alkaline lead compounds were developed, finding use in the manufacture of buttons and artificial pearls. In the 1960s, monocrystalline bismuth oxychloride pigments were developed. While these pigments lacked the toxicity problems of formerly developed pigments, they had a disadvantage of slowly turning gray with exposure to light.

Today, most silver-white pearlescent pigments are formed by coating titanium oxide on mica particles. In many ways, titanium dioxide is an ideal material for a pearlescent pigment, having a suitably high refractive index for high gloss, together with a low price, excellent resistance to degradation due to light, heat, or chemicals, and a lack of toxicity allowing its use even as a food additive. While these features have made titanium dioxide the most important white pigment in the world, all attempts produce a lamellar form of this material have failed. This difficulty is overcome by coating titanium dioxide over a lamellar mica core. Mica blocks are ground and classified according to particle size. Finer mica particles scatter more light at the corners and edges, reducing the shine but increasing the ability of the pigment to hide whatever is below it. Common distributions of mica particle sizes are 5–25 $\mu$m for a silky gloss, 10–50 $\mu$m for a brilliant shine, and 30–150 $\mu$m for glittering pigments. Before coating, the thickness of the mica particles is 100–500 nm. The coating process is generally carried out through the hydrolysis of a titanium salt solution in a mica suspension, forming a titanium dioxide coating about 40–60 nm thick.

What is needed is a door or window blind slat having the reflectance characteristics of the pearlescent pigments described above, together with translucent properties allowing the transmission of light from outside into a room during daytime.

DESCRIPTION OF THE PRIOR ART

U.S. Pat. No. 4,877,077, for which a reexamination certificate was issued on Jul. 30, 1991, discloses a vertical louver made from coextruded vinyl thermoplastic, with a transparent outer layer containing a pearlescent pigment being coextruded with an opaque base layer. The opaque base layer is visible, reflecting light through the pearlescent surface layer. Optionally, a transparent or translucent tinting color dye is incorporated in the outer layer. This type of louver does not provide a translucent structure, being opaque due to the properties of the base layer. Furthermore, the restriction of the outer layer to transparency causes the perceived color of the pearlescent surface to be a combination of colors making up the transparent layer and the color of the opaque base layer. This structure thus causes the appearance of the louvers to be sensitive to minute variations in the thickness of the outer layer, creating, for example, an appearance of undesirable streaking. Since imperfections in the consistency of the extruded compound, such as polymer gels, are more likely to occur in compounds having low filler or pigment levels, the transparent outer layers of the louver is likely to present such imperfections in a visible manner.

U.S. Pat. No. 5,119,871 describes an elongate louver or assembly of louvers, each comprising an opacified pearlescent outer layer having a claimed range of opacity which substantially or completely occludes a base layer, while allowing a pearlescent luster to be retained. The increased opacity substantially reduces or eliminates perceptible non-uniformity in coloration, shade change, and thickness of the outer layer while improving resistance to yellowing, processing characteristics, and raw material cost economics.

While the louver of U.S. Pat. No. 5,119,871 is specifically configured to present a pearlescent appearance, the opacity of both the inner and outer layers contribute to an overall opacity, substantially preventing the entry of outside light through the louvers. What is needed is a substantially translucent louver (or slat) capable of transmitting a substantial portion of outside light.

SUMMARY OF THE INVENTION

It is therefore a first objective of the present invention to provide a horizontal or vertical blind slat which is pearlescent when illuminated by reflected light from inside a room, but which is translucent when illuminated by exterior light.

It is a second objective of the present invention to provide a horizontal or vertical blind slat which has a different color appearance when illuminated by transmitted light than when illuminated by reflected light.

It is a third objective of the present invention to provide a horizontal or vertical blind slat in which a transparent base layer is encapsulated by one or more external pigmented layers having particularly effective resistance to discoloring with exposure to ultraviolet light (UV).

It is a fourth objective of the present invention to provide a means for manufacturing a horizontal or vertical blind slat with differing thicknesses of transparent and pearlescent material, in a common set of extrusion dies, to control the percentage of light transmitted through the slat.

It is a fifth objective of the present invention to provide a translucent horizontal or vertical blind slat having a matte pearlescent finish on a side exposed within a room.

It is a sixth objective of the present invention to provide a horizontal or vertical blind slat having a paper or foil laminated surface with a matte finish.

In accordance with one aspect of the invention, there is provided a translucent slat for a blind assembly. The slat includes a translucent inside layer, a translucent outside layer, and a transparent first base layer. The inside layer extends along a first external surface of the slat, while the outside layer extends along a surface of the slat opposite the first external surface. Both the inside and outside layers include components preventing discoloration by ultraviolet light.

BRIEF DESCRIPTION OF THE DRAWINGS

FIG. 1 is a fragmentary transverse cross-sectional view of a slat made in accordance with a first embodiment of the present invention to include a number of coextruded layers;

FIG. 2 is a schematic view of the internal transmission and reflection of light within an inside layer of the slat of FIG. 1;

FIG. 3 is a fragmentary longitudinal cross-sectional view of a die set used in the extrusion of material for the slat of FIG. 1;

FIG. 4 is a fragmentary end elevational view of the die set of FIG. 2.

FIG. 5 is a side elevation of a texturing station used to form an optional textured pattern on a surface of the material being extruded from the die set of FIG. 3;

FIG. 6 is a fragmentary transverse cross-sectional view of a slat made in accordance with a second embodiment of the present invention to include a number of coextruded layers together with a laminated layer;

FIG. 7 is a side elevation of a texturing and lamination station used to form material for the slat of FIG. 6;

DETAILED DESCRIPTION

Figure 8:
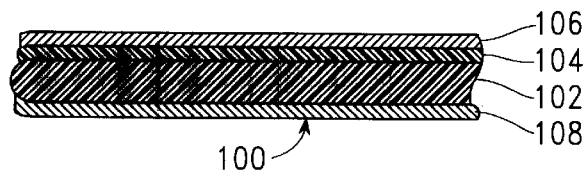
FIG. 8 is a fragmentary transverse cross-sectional view of a slat made in accordance with a third embodiment of the present invention to include two coextruded layers together with two laminated layers.

FIG. 1 is a fragmentary transverse cross-sectional view of a slat 10, made in accordance with a first embodiment of the present invention, to include a number of coextruded layers. The width of slat 10 extends in the direction of arrow 11, with its length, extending perpendicularly from the direction of arrow 11, being much greater than its width. This slat 10 includes an inside layer 12, which is preferably inwardly exposed (into a room) when the blind including the slat 10 are closed, and an outside layer 14, which is preferably correspondingly outwardly exposed when the blind is closed. A first base layer 16 and a second base layer 18 lie between the inside layer 12 and the outside layer 14.

The inside layer 12, which is 0.08–0.18 mm (0.003–0.007 inch) thick, is preferably composed of a UV stabilized PVC material having pearlescent pigmentation, such as the material sold by the Geon Company as GEON 87654. The outer layer 14, which is 0.13–0.18 mm (0.005–0.007 inch) thick, is preferably composed of a semi-transparent UV stabilized PVC, such as GEON No. 1260. The first base layer 16, which is 0.25–0.51 mm (0.010–0.020) inch thick, is preferably composed of a clear PVC material, such as GEON No. 87727-002. The second base layer 18, which is 0.13–0.18 mm (0.005–0.007) inch thick, is composed, for example, of a UV stabilized PVC material having pearlescent pigmentation, such as GEON No. 87654. The UV stabilizing components serve to prevent transmission of ultra-violet rays through one layer into another.

In one version of the present invention, the inside layer 12 includes a P.20 to P.40 foaming agent, mixed with the PVC material at a ratio of 3 to 6 percent. This concentration of foaming agent, being insufficient to produce a structural foam product, produces a number of small gas pockets, some of which, being near the surface of the slat 10, cause the appearance of a matte finish on this surface, in place of the glossy finish generally characterizing the surface of a molded or extruded plastic part. The type of foaming agent and its concentration are determined according to the surface roughness desired in the finished product. In the example of FIG. 1, the small gas pockets produced by the foaming agent also contribute to a cloudy, translucent appearance desired when the slat 10 is illuminated with transmitted outdoor light.

While FIG. 1 shows a portion of the slat 10 adjacent to a longitudinal edge 18a thereof, it is understood that the opposite longitudinal edge of the slat has features similar to those shown in FIG. 1. In particular, the inside layer 12 and the outside layer 14 extend around the base layers 16, 18, overlapping at the rounded edge 18a. This configuration allows a relatively high concentration of pigments and UV stabilizers and in the layers 12, 14 to protect the base layers 16, 18 from discoloration which might otherwise occur if sunlight were allowed to enter these layers 12, 14 directly along the edge 18a. This feature of the present invention provides a significant advantage over the prior-art multilayer extruded slats of U.S. Pat. Nos. 4,877,077 and 5,119,871, both of which show an inner layer exposed along the edges of a slat. This feature is particularly significant as a part of the present invention, as it facilitates the use of one or more base transparent base layers which cannot otherwise be sufficiently protected from discoloration with UV exposure over time.

FIG. 2 is a schematic cross-sectional view of the internal transmission and reflection of a light ray 19 in the inside layer 12, which includes a number of pearlescent pigment particles 19a. The light ray 19 enters the inside layer 12 from the second base layer 18, having travelled through the semi-transparent outside layer 14 and the transparent first base layer 16 (both shown in FIG. 1). Each time the ray 19 strikes a surface of a pigment particle 19a, a first portion of the ray is reflected, while a remaining second portion is refracted and transmitted. The transmitted portion eventually emerges as exiting ray 19b.

This figure is admittedly a schematic oversimplification of the structure of inside layer 12. In a preferred version of the present invention, this layer is 0.08 to 0.2 mm (0.003 to 0.007 in.) thick, being composed of a transparent PVC material filled with pearlescent pigment particles which, being configured particularly to produce a silvery-white appearance when viewed by reflected light, are composed of mica particles having a length of 5–25 $\mu$m and a thickness of 100–500 nm, coated with a layer to titanium oxide having a thickness of 40–60 nm. Thus, while the actual thickness of the pigment particles 19a, compared to the thickness of the layer 12, is much smaller than that shown in the figure, there are many more layers of pigment particles 19a within the layer 12 than shown in the figure.

Since the pearlescent pigment particles both transmit and reflect light, they are particularly desirable in the application of a layer of material being configured for overall translucence. With the alternative use of absorptive pigmentation, light rays striking pigment particles are simply absorbed. However, the layer of material including pearlescent pigmentation must be quite thin to provide a suitable level of translucence.

FIG. 3 is a longitudinal cross-sectional view of an extrusion die set 20 used in the production of the slat of FIG. 1.

The first base layer 16 is formed first, with thermoplastic material 20a being forced from a cavity 22 in the direction of arrow 24 through a channel 26 in a first die 28. The first die 28 also includes an input channel 30 through which thermoplastic material 32 is inserted to form second base layer 18. The input channel 30 is connected by a narrowed channel 34 to a trough 36 extending along a portion of the periphery of channel 26 corresponding to the peripheral contact between the second base layer 18 and the first base layer 16. The shape of second layer 18 is determined by the shape of a channel surface 37 extending through a second die 38 and partially through a third die 40. Second die 38 also includes an input channel 42 through which thermoplastic material 44 is inserted to form outside layer 14. The input channel 42 is connected by a narrowed channel 46 to a trough 48 extending along a portion of the periphery of channel 26 corresponding to the peripheral contact between the first base layer 16 and the outside layer 14. The shape of outside layer 14 is further determined by the shape of a channel surface 50 extending through third die 40 and through a fourth die 52. The third die 40 also includes an input channel 54 through which thermoplastic material 56 is inserted to form inside layer 12. The input channel 54 is connected by a narrowed channel 58 to a trough 60 extending along a portion of the periphery of the second base layer 18 corresponding to the extent of peripheral contact between the second base layer 18 and the inside layer 12. The shape of inside layer 12 is further determined by a channel surface 62 extending through the fourth die 52.

FIG. 4 is an end elevational view of the die set 20, as viewed in a direction opposite that of arrow 24 in FIG. 3. FIG. 4 shows an end of the die openings, within which a longitudinally extending rounded edge 18a of the slat 10 (shown in FIG. 1) is formed by coextrusion.

Referring to FIGS. 1 and 4, the channel surfaces 26, which determine the shape of first base layer 16, are formed in the shape of a slot with rounded ends 64, around which the channel surface 50, forming the shape of outside layer 14 partly extends. The trough 48, through which material is supplied to form the outside layer 14, also extends partly each slot end 64. The channel surface 37, which determines the shape of second base layer 18, also wraps partly around the slot ends 64. The channel surface 62, which determines the shape of inside layer 12 wraps around the end 64 outside the surfaces 37, 50. The trough 60, through which material is supplied to form the inside layer 12, also wraps around the end 64. In this way, the outer layers 12, 14, are formed to overlap and to encapsulate the inner layers 16, 18.

FIG. 5 is a side elevation of a texturing station 66 used to impart a texture pattern on an inside surface 68 of slat material 70 being extruded from the die set 20. This texturing station 66 includes a metal texturing roll 72 and a back-up roll 74 having a rubber coated peripheral surface 76. The peripheral surface 78 of the texturing roll has a pattern which is the inverse of the pattern to formed in the inside surface 68, with ridges in the peripheral surface 78 forming grooves in the slat material surface 68. The rolls 72, 74 are allowed to rotate freely with the motion of the slat material 70 in the direction of arrow 24, but are held in engagement with the slat material 70 by means of a spring force or through the maintenance of a predetermined gap between the peripheral surfaces 76, 78. After passing between the rolls 72, 74, the slat material 70 tends to follow the surface of the back-up roll 74, being pulled therefrom to pass between a pair of idler rolls 80 onto a conveyer belt system 82. The slat material is cooled as it moves along the conveyer belt system 82, and is cut to a suitable length by a powered knife (not shown) moving with the slat material 70 during the cutting process.

Referring again to FIGS. 1 and 3, the second base layer 18, which has been described above as being composed of a UV stabilized PVC material having pearlescent pigmentation, such as GEON No. 87654, is alternatively composed of a clear PVC material, such as GEON No. 87727-002. In this way, the second base layer 16 is used to provide a significant change in the percentage of light transmitted through the slat 10 without reformulating the plastic materials and without changing the die set 20. Experiments have shown, for example, that the percentage of light transmitted through a slat of this type having the second base layer 18 composed of a PVC with pearlescent pigmentation is approximately six percent, while the percentage of light transmitted through an otherwise similar slat having the first base layer 16 composed of a clear PVC is approximately twelve percent. While the use of four layers provides this advantage of the present invention, it is understood that a version of the present invention includes only three layers—an inside layer, and outside layer, and a transparent base layer.

The layered construction of the present invention further allows the use of a relatively thick base layer, which is transparent to preserve the overall translucency of the slat, while achieving an overall thickness sufficient to retain stiffness and strength within the slat.

While the second base layer 18 is described above as being composed of a clear transparent PVC, this layer 18 is alternately composed of a pigmented transparent PVC material to provide transmitted light having the color of the pigmented material. A slat made in this way retains its silver-white appearance when it is illuminated from inside, with light reflected from the slat, but changes its effective color to a muted version of second layer. A particularly attractive slat has been made in this manner using a red pigment within the second base layer 18.

FIG. 6 is a fragmentary cross-sectional view of a slat 83 made in accordance with a second embodiment of the present invention, including three coextruded thermoplastic layers and a laminated inside layer 84. The coextruded layers include a first base layer 86, a second base layer 88, and an outside layer 90. These layers 86, 88, and 90, are similar in material and thickness to corresponding layers 16, 18, and 14, of slat 10, which have been described above in reference to FIG. 1, with the second base layer 88 being composed of clear material without pearlescent pigmentation. The laminated inside layer 84 is, for example, a transfer paper strip composed of a paper substrate coated with a heat-activated adhesive used for attachment to the second base layer 88. One or more layer(s) of ink are present on the exterior surface of the paper substrate in the form of a pattern, and the ink, together with areas of the paper substrate devoid of ink, if such areas exist, is in turn covered by a thin plastic layer including materials providing protection from ultra-violet light. In a first version of this embodiment, the laminated inside layer 84 is at least partially translucent, with, for example, light from outside being transmitted through the outside layer 90, the base layers 86, 88 and the laminated inside layer 84. The laminated inside layer 84 may be opaque in some of all of the areas where ink is printed, with the printed area being made visible through light shining through surrounding background areas in the layer 84. Thus, translucence of the slat 83 is achieved with the transparent layers 86, 88 being protected from UV by substances in the outside layer 90 and the laminated inside layer 84. The outside layer 90 is formed to wrap around the first base layer 86 at a rounded end 92.

The laminated inside layer 84 may alternately have a substrate composed of a polyester material sold by DuPont under the tradename MYLAR. This material may be etched to provide a surface suitable for printing. The MYLAR sheet may alternately be metalized, or a metal foil may be used, so that a high reflectance is achieved without translucense.

In one version of this embodiment, a foaming agent is added to the second base layer 88, as described above in reference to FIG. 1, providing an attractive matte finish visible in the texture of the laminated inside layer 84. When the laminated inside layer 84 is also fully or partially translucent, the gas bubbles produced by the foaming agent also help in producing diffused lighting with an interesting pattern.

While the example of FIG. 6 shows three coextruded layers 86, 88, 90, this embodiment of the present invention may be constructed without the second base layer 88, or with additional coextruded layers (not shown). Various coextruded layers may be used to advantage as described above in reference to FIG. 1, providing for the display of a colored pigment when light is transmitted through the slat or for finer control over the level of light transmission, as certain layers are either clear or translucent.

FIG. 7 is a side elevational view of a station used to provide a textured pattern with rolls 72, 76, as explained above in reference to FIG. 5, and to laminate the inside layer 84 atop the slat material 70 being extruded through a die set 20. The inside layer 84 is supplied as a long strip from a spool 94, being pulled along with the extruded material 70 between a pair of freely turning rolls 96, 97 each of which has a rubber peripheral surface 98. The elevated temperature of the extruded material 70 is sufficient to activate the heat-activated adhesive coated on the inside layer 84, resulting in a tight adhesive bond between this layer 84 and the underlying material 70. While FIG. 7 shows the texturing process being applied to the extruded material 70 before lamination, the texturing process may alternately be applied after lamination to emboss the laminate 84, or even during lamination, with the upper roll 96 having the textured peripheral surface.

FIG. 8 is a fragmentary cross-sectional view of a slat 100 built in accordance with a third embodiment of the present invention. This slat 100 includes a first base layer 102 coextruded with a second base layer 104. Both an inside layer 106 and an outside layer 108 are laminated strips. In this example, both these layers 106, 108 are opaque. Since translucence is not required, the base layers 102, 104 are opaque, with additives as needed to provide UV resistance. As described above in reference to FIGS. 1 and 6, the second base layer 104 includes a foaming agent to form gas pockets giving a desirable matte finish to the inside layer 106. In an alternate version of this embodiment, the second base layer 104 is eliminated, with a foaming agent being added to the first base layer 102.

Figure 9:
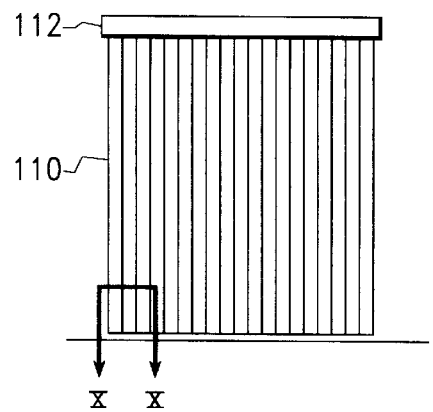
FIG. 9 is a front elevation of a vertical blind assembly including a number of slats of a type shown in FIGS. 1, 6, or 8.

FIG. 9 is a front elevation of a vertical blind assembly having a number of the slats 110 hanging from a track system 112, which is of a conventional type well know to those skilled in the art of window and door coverings. Each slat 110 is of a type described above, either in reference to FIG. 1, FIG. 6, or FIG. 8. Each slat 110 includes an aperture by which it is held on a slat holder (not shown) within the track system 112.

Figure 10:
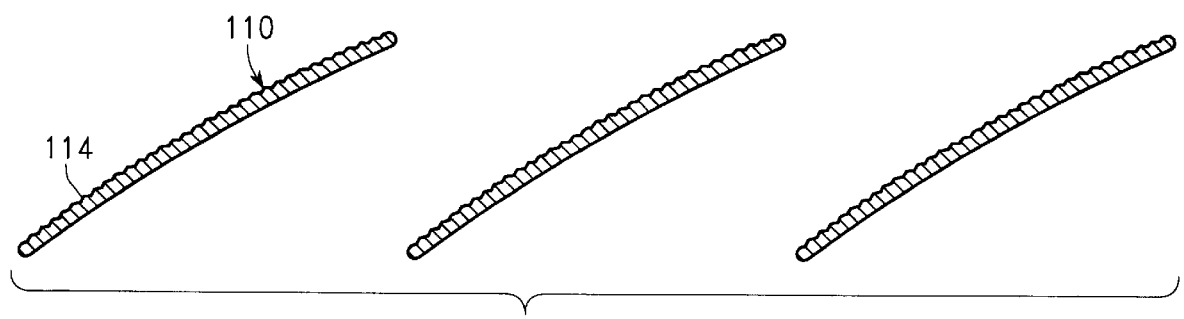
FIG. 10 is a fragmentary cross-sectional plan view of the vertical blind assembly of FIG. 9, taken as indicated by sectional lines X-X therein.

FIG. 10 is a fragmentary plan view of the vertical blind assembly of FIG. 9, taken as indicated by section lines X—X in FIG. 9 to show three slats 110. Each slat 110 has an inside surface 114, which has, for example, a textured surface formed as described above in reference to FIG. 5. The transverse sectional shape of the slat 110 is further characterized by a curvature of the inside surface 114, such as a convex or "S"-shaped curvature, into which the slat material 70 (shown in FIG. 5) is formed following the extrusion process, while the material is still warm.

Referring to FIGS. 9 and 10, the track system 112 causes the slats 110 to rotate in unison about vertical axes between an open position in which the slats 110 are essentially parallel and a closed position, in which the slats 110 cooperate to cover the window or door (not shown) behind them. In this closed position, the slats 110 are preferably oriented so that their inside surfaces 114 face into the room in which the blind assembly is mounted. The track system 112 also causes the slats 110 to move toward one another and away from one another.

Figure 11:
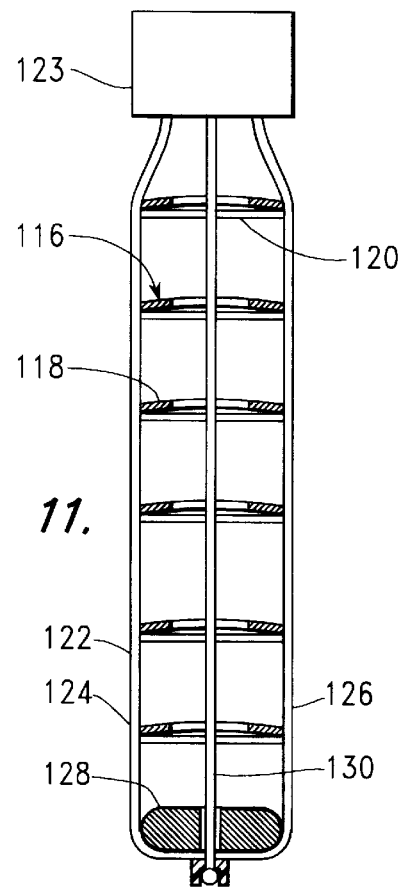
FIG. 11 is a cross-sectional end elevation of a horizontal blind assembly including a number of slats of the type shown in FIGS. 1, 6, or 8.

FIG. 11 is a cross-sectional end elevation of a horizontal blind assembly including a number of slats 116. In the rotated-open position shown, each slat 116 rests, with its inside surface 118 facing upward, on a pair of transverse support cords 120 extending within a tilt cord loop 122. The slats 116 are rotated in unison and lifted to form a stack from the bottom by means of a blind mechanism 123, which is of a type well known to those skilled in the art of window coverings. The slats 116 are preferably rotated from the open position shown by moving an inside side 124 of the cord loop 122 downward while an outside side 126 of the cord loop is moved upward, so that the inside surfaces 118 of the slats 116 are exposed within the room in which the blind assembly is mounted. A lifting bar 128 is raised by means of two or more lifting cords 130 to raise the slats 116 in a stack formed from the bottom.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. A translucent slat for a blind assembly, wherein said slat comprises:
    a translucent inside layer extending along a first external surface of said slat, with said translucent inside layer including components preventing discoloration thereof by ultraviolet light;
    a translucent outside layer extending along an external surface of said slat opposite said first external surface thereof, with said translucent outside layer including components preventing discoloration thereof by ultraviolet light; and
    a transparent first base layer extending between said translucent inside layer and said translucent outside layer,
    wherein said translucent inside layer, said translucent outside layer, and said transparent first base layer are translucent as held together in said translucent slat said translucent inside layer, said translucent outside layer, and said transparent first base layer are coextruded thermoplastic layers.

2. The translucent slat of claim 1, wherein
    said translucent inside layer and said translucent outside layer each include components restricting transmission therethrough of ultraviolet light; and
    said translucent inside layer and said translucent outside layer together encapsulate said transparent first base layer, extending around longitudinal edges of said base layer.

3. The translucent slat of claim 1, wherein said translucent inside layer includes pearlescent pigmentation.

4. The translucent slat of claim 1, wherein
    said translucent slat additionally includes a second base layer coextruded with said translucent inside layer, with said translucent outside layer, and with said transparent first base layer to extend between said first base layer and said inside layer;
    said second base layer is composed of a material altering characteristics of light transmitted through said translucent slat, and
    said translucent inside layer, said translucent outside layer, said transparent first base layer, and said second base layer are translucent as held together in said translucent slat.

5. The translucent slat of claim 4, wherein said second base layer is translucent.

6. The translucent slat of claim 4, wherein said second base layer includes a pigment causing light transmitted through said slat to be of a different color than light reflected from said inside layer thereof.

7. The translucent slat of claim 1, wherein said translucent inside layer has an external matte finish resulting from gas pockets formed by a foaming agent therein.

8. The translucent slat of claim 1, wherein said translucent slat transmits between six and twelve percent of light directed to a flat surface of said slat.

9. The translucent slat of claim 7, wherein material forming said inside layer includes a concentration of said foaming agent insufficient to produce a structural foam product.

10. The translucent slat of claim 7, wherein material forming said inside layer includes a P.20 to P.40 foaming agent, mixed with the PVC material at a ratio of 3 to 6 percent.

11. A blind assembly including a plurality of parallel slats, means for pivoting slats within said plurality thereof, and means for varying distances between adjacent slats within said plurality thereof, wherein each slat within said plurality thereof is translucent, and each slat within said plurality thereof comprises:
    a translucent inside layer extending along a first external surface of said slat, with said translucent inside layer including components preventing discoloration thereof by ultraviolet light;
    a translucent outside layer extending along an external surface of said slat opposite said first external surface thereof, with said translucent outside layer including components preventing discoloration thereof by ultraviolet light; and
    a transparent first base layer extending between said translucent inside layer and said translucent outside layer said translucent inside layer, said translucent outside layer, and said transparent first base layer are coextruded thermoplastic layers.

12. The blind assembly of claim 11, wherein each slat within said plurality thereof additionally comprises a second base layer, with said translucent inside and outside layers, and said first and second base layers being coextruded thermoplastic layers, and with said second base layer including a pigment causing light transmitted through said slat to be of a different color than light reflected from said inside layer.

* * * * *